(12) United States Patent
Chhabra et al.

(10) Patent No.: US 10,083,304 B2
(45) Date of Patent: Sep. 25, 2018

(54) TECHNOLOGIES FOR ENHANCED USER AUTHENTICATION USING ADVANCED SENSOR MONITORING

(71) Applicant: Intel Corporation, Santa Clara, CA (US)

(72) Inventors: Jasmeet Chhabra, Hillsboro, OR (US); Ned M. Smith, Hillsboro, OR (US); Micah J. Sheller, Hillsboro, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/445,298

(22) Filed: Feb. 28, 2017

(65) Prior Publication Data

US 2017/0169231 A1    Jun. 15, 2017

Related U.S. Application Data

(63) Continuation of application No. 14/580,785, filed on Dec. 23, 2014, now abandoned.

(51) Int. Cl.
*H04L 29/06* (2006.01)
*G06F 21/57* (2013.01)
(Continued)

(52) U.S. Cl.
CPC ............ *G06F 21/577* (2013.01); *G06F 21/31* (2013.01); *G06F 21/316* (2013.01); *G06F 21/32* (2013.01);
(Continued)

(58) Field of Classification Search
CPC ...... G06F 21/577; G06F 21/31; G06F 21/316; G06F 21/32; G06F 21/53; G06N 99/005; H04L 63/083; H04L 63/0861
(Continued)

(56) References Cited

U.S. PATENT DOCUMENTS

| 8,646,060 B1* | 2/2014 | Ben Ayed | H04L 63/0853 726/9 |
| 2004/0111637 A1* | 6/2004 | Baffes | G06F 21/316 726/23 |

(Continued)

OTHER PUBLICATIONS

European Search Report dated Jun. 6, 2018 for European Patent Application No. 15873938.3-1218, 9 pages.
(Continued)

*Primary Examiner* — Michael S McNally
(74) *Attorney, Agent, or Firm* — Barnes & Thornburg LLP

(57) ABSTRACT

Technologies for information security include a computing device with one or more sensors. The computing device may authenticate a user and, after successful authentication, analyze sensor data to determine whether it is likely that the user authenticated under duress. If so, the computing device performs a security operation such as generating an alert or presenting false but plausible data to the user. Additionally or alternatively, the computing device, within a trusted execution environment, may monitor sensor data and apply a machine-learning classifier to the sensor data to identify an elevated risk of malicious attack. For example, the classifier may identify potential user identification fraud. The computing device may trigger a security response if elevated risk of attack is detected. For example, the trusted execution environment may trigger increased authentication requirements or increased anti-theft monitoring for the computing device. Other embodiments are described and claimed.

19 Claims, 5 Drawing Sheets

(51) Int. Cl.
  G06F 21/31      (2013.01)
  G06F 21/32      (2013.01)
  G06F 21/53      (2013.01)
  G06N 99/00      (2010.01)
  H04W 12/06      (2009.01)
  H04W 12/12      (2009.01)

(52) U.S. Cl.
  CPC ........... *G06F 21/53* (2013.01); *G06N 99/005* (2013.01); *H04L 63/083* (2013.01); *H04W 12/06* (2013.01); *H04W 12/12* (2013.01); *G06F 2221/034* (2013.01); *G06F 2221/2115* (2013.01); *H04L 63/0861* (2013.01); *H04L 2463/082* (2013.01)

(58) Field of Classification Search
  USPC .......................................................... 726/19
  See application file for complete search history.

(56) References Cited

U.S. PATENT DOCUMENTS

| | | | |
|---|---|---|---|
| 2013/0091561 A1 | 4/2013 | Bruso | |
| 2014/0075496 A1* | 3/2014 | Prakash | G06F 21/6218 726/1 |
| 2014/0082738 A1* | 3/2014 | Bahl | G06F 21/577 726/25 |
| 2014/0137251 A1* | 5/2014 | Lee | G06F 21/56 726/23 |
| 2014/0325586 A1 | 10/2014 | Halliday | |
| 2014/0359722 A1 | 12/2014 | Schultz | |
| 2016/0135046 A1* | 5/2016 | John Archibald | H04W 12/06 455/411 |
| 2016/0155069 A1* | 6/2016 | Hoover | G06Q 30/06 706/12 |

OTHER PUBLICATIONS

Carmen Sanchez Avila et al: "State of the art of mobile biometrics, liveness and non-coercion detection", Mar. 4, 2014 (Mar. 4, 2014), XP055478777, Retrieved from the Internet:URL : https: // www. pcas-proiect.eu/ images/Deliverables/PCAS-D3. 1. pdf*[retrieved on May 28, 2018], 136 pages.

* cited by examiner

TECHNOLOGIES FOR ENHANCED USER AUTHENTICATION USING ADVANCED SENSOR MONITORING

CROSS-REFERENCE TO RELATED APPLICATION

The present application is a continuation application of U.S. application Ser. No. 14/580,785, entitled "TECHNOLOGIES FOR ENHANCED USER AUTHENTICATION USING ADVANCED SENSOR MONITORING," which was filed on Dec. 23, 2014.

BACKGROUND

Typical computing devices may include several technical methods for user authentication. For example, a computing device may support password authentication, biometric authentication (e.g., fingerprint, iris, and/or retina scanning), physical token authentication, or other technical authentication measures. However, many of those authentication methods may be defeated by coercing the user to release credentials, for example by the threat of force. For example, a thief may force the user to withdraw funds from an automated teller machine (ATM), or an attacker may force a user to decrypt sensitive documents. Typical computing devices may prevent coerced authentication by providing two passwords to the user: the user's regular password and a "distress" password that may trigger a security response. The use of a distress password may not be possible with biometric authentication or other advanced authentication techniques.

Typical computing devices may also provide anti-theft or anti-intrusion features. For example, some devices allow a user, administrator, or other operator to send a platform disable message to the computing device in the event of theft or loss. As another example, some intrusion detection solutions use network sniffers and traffic analysis software to identify anomalies in network traffic. An operator may monitor for anomalies, and may similarly lockdown or otherwise disable the platform. Typical anti-theft, anti-intrusion, or other anti-attack features thus require human intervention to identify the attack scenario and take appropriate action.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
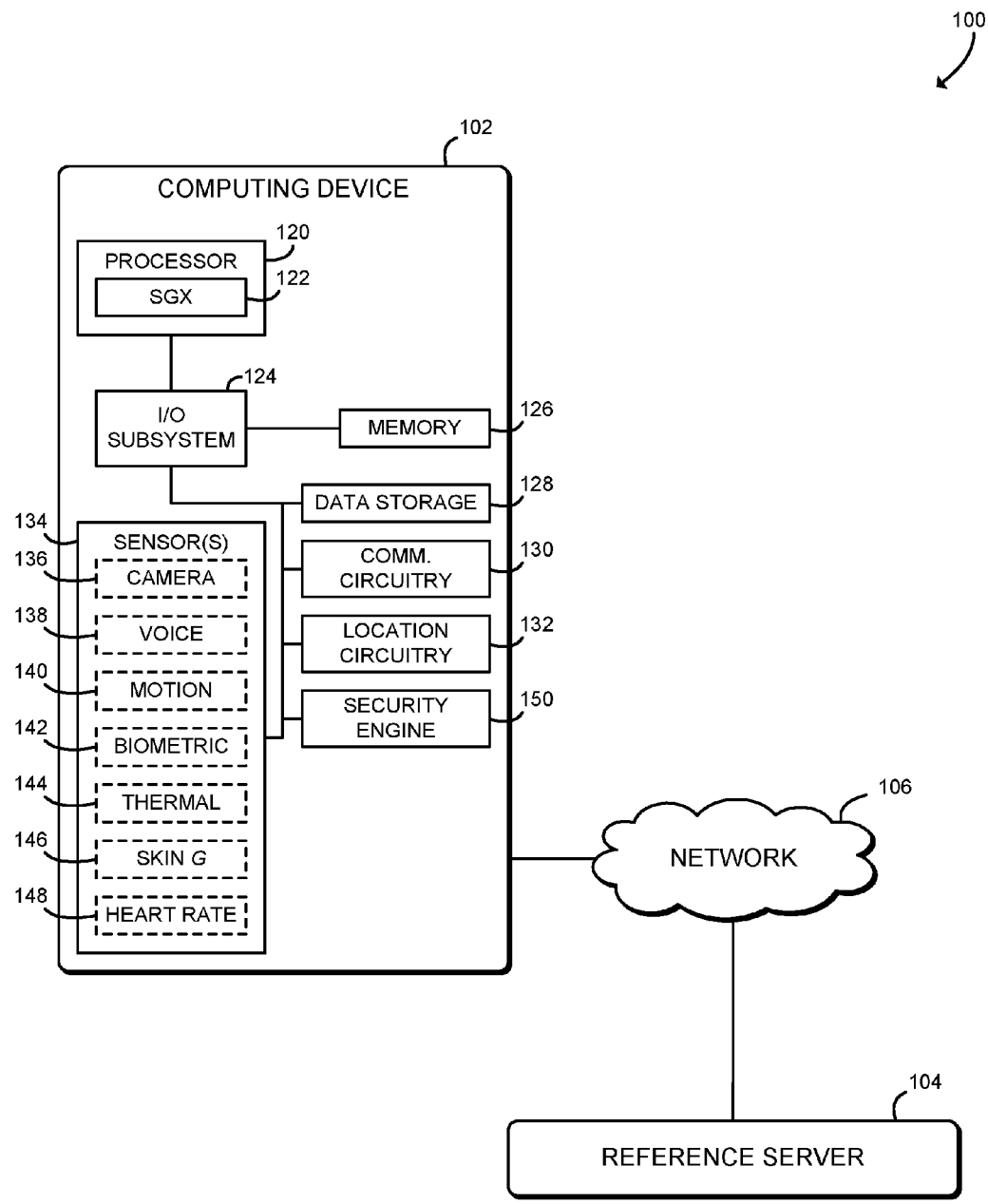
FIG. 1 is a simplified block diagram of at least one embodiment of a system for user authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for enhanced user authentication includes a computing device 102 and a reference server 104 in communication over a network 106. In use, as described in more detail below, in some embodiments a user may authenticate to the computing device 102, for example using password or biometric authentication. If the authentication is successful, the computing device 102 analyzes sensor data and determines whether the user was likely under duress or otherwise coerced during authentication. If so, the computing device 102 performs a security operation such as allowing access to false, but plausible data. The computing device 102 may thus protect user data against successful but coerced authentication. Security and user safety may be improved by not requiring the user to remember a second, "distress" password while being forced to authenticate under duress. Additionally, the computing device 102 is compatible with biometric authentication and other advanced, non-password-based authentication measures.

Additionally or alternatively, in use, as described in more detail below, in some embodiments the computing device 102 may establish a trusted execution environment and monitor one or more sensors from within the trusted execution environment. The computing device 102 may apply a machine-learning classification algorithm within the trusted execution environment to the sensor data to identify whether an elevated risk of malicious attack exists. In some embodiments, the computing device 102 may receive training data for the classification algorithm from the reference server 104. The training data may be based on attack patterns that have already been observed by many other computing devices 102. If elevated risk exists, the computing device 102 may trigger a security response, for example increasing authentication requirements or increasing anti-theft monitoring. Thus, the computing device 102 may improve security and usability by allowing convenient authentication (for example, fingerprint authentication) in low-risk circumstances and requiring more effective but less usable authentication only in elevated risk scenarios. Additionally, the computing device 102 may improve power consumption and/or battery life by enabling higher-intensity threat monitoring only when elevated risk exists. Receiving training data from the reference server 104 may reduce training time and/or improve classification accuracy. By collecting and analyzing potentially sensitive sensor data within a trusted execution environment, user privacy may be protected.

The computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, an automatic teller machine (ATM), a distributed computing system, a processor-based system, and/or a consumer electronic device. As shown in FIG. 1, the computing device 102 illustratively includes a processor 120, an input/output subsystem 124, a memory 126, a data storage device 128, and communication circuitry 130. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in one or more processors 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. In some embodiments, the processor 120 includes secure enclave support 122. The secure enclave support 122 allows the processor 120 to establish a trusted execution environment (TEE) in which executing code may be measured, verified, or otherwise determined to be authentic. Additionally, code and data included in the TEE may be encrypted or otherwise protected from being accessed by code executing outside of the TEE. The secure enclave support 122 may be embodied as a set of processor instruction extensions that allow the processor 120 to establish one or more secure enclaves in the memory 126, which may be embodied as regions of memory including software that is isolated from other software executed by the processor 120. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processors 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store the contents of one or more trusted execution environments. When stored by the data storage device 128, the contents of the trusted execution environments may be encrypted to prevent access by unauthorized software.

The communication circuitry 130 of the computing device 102 may be embodied as any communication circuit, device, or collection thereof, capable of enabling communications between the computing device 102, the reference server 104, and/or other remote devices over the network 106. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

The computing device 102 may also include location circuitry 132. The location circuitry 132 of the computing device 102 may be embodied as any type of circuit capable of determining the precise or approximate position of the computing device 102. For example, the location circuitry 132 may be embodied as a global positioning system (GPS) receiver, capable of determining the precise coordinates of the computing device 102. In other embodiments, the location circuitry 132 may triangulate or trilaterate the position of the computing device 102 using distances or angles to cellular network towers with known positions, provided by the communication circuitry 130. In other embodiments, the location circuitry 132 may determine the approximate position of the computing device 102 based on association to wireless networks with known positions, using the communication circuitry 130.

The computing device 102 also includes a number of sensors 134 to detect features of the environment and/or the user. The computing device 102 may support powering off one or more of the sensors 134 to reduce power consumption. In some embodiments, the processor 120, I/O subsystem 124, and/or other SoC component may include an integrated sensor hub that may record or otherwise monitor data produced by the sensors 134 while the computing device 102 is in a low-power state. The sensors 134 may include, for example, a camera 136, a voice sensor 138, one or more motion sensor(s) 140, a biometric sensor 142, a thermal imaging sensor 144, a skin conductance sensor 146, and/or a heart rate sensor 148. Of course, the computing device 102 may include additional or other sensors 134 in other embodiments.

The camera 136 may be embodied as a digital camera or other digital imaging device integrated with the computing device 102 or otherwise communicatively coupled thereto. The camera 136 includes an electronic image sensor, such as an active-pixel sensor (APS), e.g., a complementary metal-oxide-semiconductor (CMOS) sensor, or a charge-coupled device (CCD). The camera 136 may be used to capture images of the environment and/or user of the computing device 102 including, in some embodiments, capturing still images or video images.

The voice sensor 138 may be embodied as any sensor capable of interpreting voice input of the user. For example, the voice sensor 138 may be embodied as an audio input or other sensor capable of capturing audio signals, such as a microphone, a line input jack and associated circuitry, an analog-to-digital converter (ADC), or other type of audio sensor.

The motion sensor(s) 140 may be embodied as one or more of any sensor capable of sensing motion of the computing device 102 including, for example, one or more accelerometers, gyroscopes, compasses, or any other type of device or devices capable of detecting device motion. For example, the motion sensor(s) 140 may include a three-axis accelerometer and a three-axis gyroscope, allowing motion tracking in three linear dimensions and about three rotational axes.

The biometric sensor 142 may include any sensor that measures a physiological attribute of the user of the computing device 102. The biometric sensor 142 may be integrated with or otherwise used by an authentication subsystem of the computing device 102. The biometric sensor 142 may include, for example, a fingerprint reader, an iris scanner, and/or a retina scanner.

The thermal imaging sensor 144 may be embodied as any sensor capable of measuring temperature of the environment and/or user of the computing device 102. For example, the thermal imaging sensor 144 may be embodied as a thermal imaging camera or a thermographic camera.

The skin conductance sensor 146, also known as a galvanic skin response (GSR) sensor, may be embodied as a sensor that, when placed in contact with the user's skin, measures the electrical conductance of the skin. Electrical conductance of the skin varies with the skin's moisture level, and thus may indicate activity of the sweat glands, which in turn is may indicate the existence of a physiological or psychological condition.

The heart rate sensor 148 may be embodied as a sensor that detects the pulse rate of the user, for example by measuring minute color changes in the user's skin and/or eyes caused by pulsing blood. Additionally or alternatively, other sensors 134 may be used as the heart rate sensor 148; for example, the thermal imaging sensor 144 may be used as the heart rate sensor 148.

In some embodiments, the computing device 102 may also include a security engine 150, which may be embodied as any hardware component(s) or circuitry capable of establishing a trusted execution environment (TEE) on the computing device 102. In particular, the security engine 150 may support executing code and/or accessing data that is independent and secure from other code executed by the computing device 102. The security engine 150 may be embodied as a Trusted Platform Module (TPM), a manageability engine, an out-of-band processor, or other security engine device or collection of devices. In some embodiments the security engine 150 may be embodied as a converged security and manageability engine (CSME) incorporated in a system-on-a-chip (SoC) of the computing device 102. Further, in some embodiments, the security engine 150 is also capable of communicating using the communication circuitry 130 or a dedicated communication circuit independently of the state of the computing device 102 (e.g., independently of the state of the main processor 120), also known as "out-of-band" communication.

As described above, in some embodiments the system 100 may include a reference server 104. The reference server 104 is configured to maintain a database of training data that may be used to train the machine learning classifier of the computing device 102. The reference server 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. The reference server 104 may include components and devices commonly found in a server or similar computing device, such as a processor, an I/O subsystem, a memory, a data storage device, communication circuitry, and/or other peripheral devices. Those individual components of the reference server 104 may be similar to the corresponding components of the computing device 102, the description of which is applicable to the corresponding components of the reference server 104 and is not repeated herein so as not to obscure the present disclosure. Additionally, in some embodiments, the reference server 104 may be embodied as a "virtual server" formed from multiple computing devices distributed across the network 106 and operating in a public or private cloud. Accordingly, although the reference server 104 is illustrated in FIG. 1 as embodied as a single server computing device, it should be appreciated that the reference server 104 may be embodied as multiple devices cooperating together to facilitate the functionality described below.

As discussed in more detail below, the computing device 102 and the reference server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
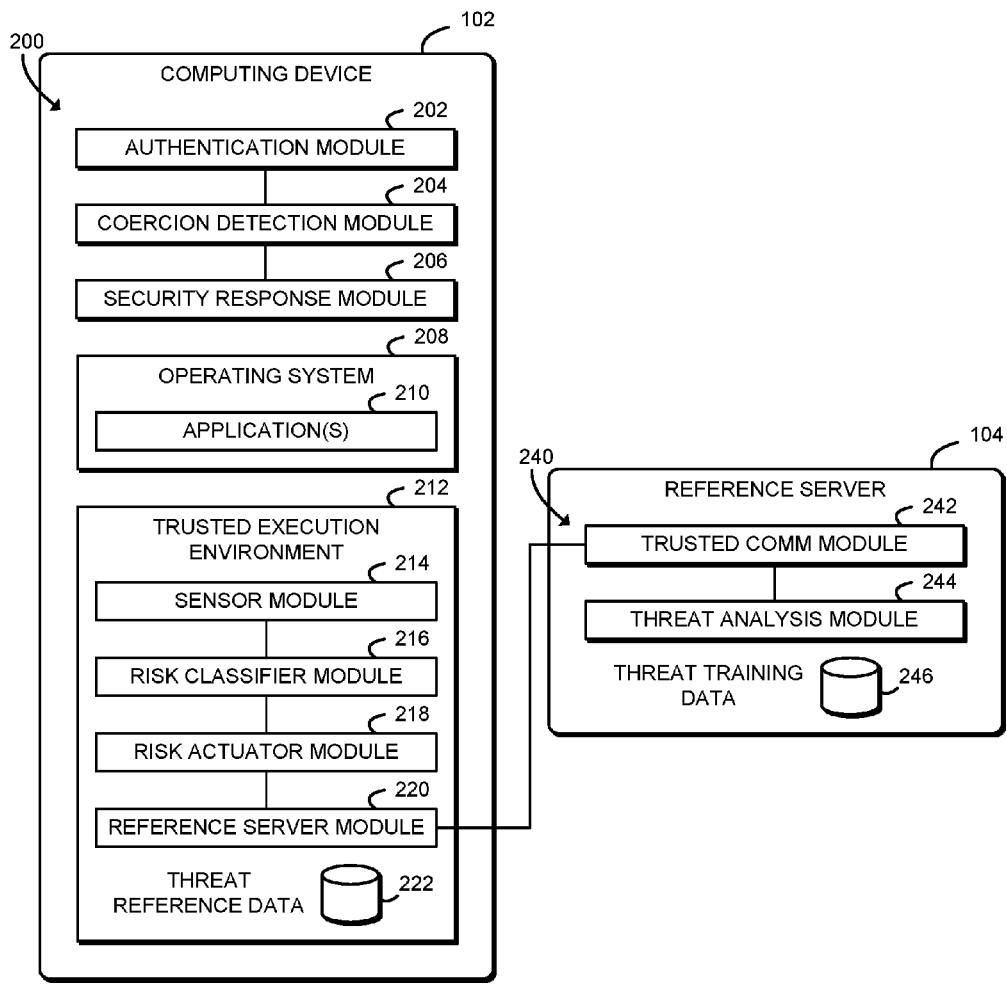
FIG. 2 is a simplified block diagram of at least one embodiment of various environments that may be established by the system of FIG. 1.

Referring now to FIG. 2, in an illustrative embodiment, the computing device 102 establishes an environment 200 during operation. The illustrative environment 200 includes an authentication module 202, a coercion detection module 204, a security response module 206, an operating system 208, and a trusted execution environment 212. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 102. As such, in some embodiments, any one or more of the modules of the environment 200 may be embodied as a circuit or collection of electrical devices (e.g., an authentication circuit, a coercion detection circuit, etc.).

The authentication module 202 is configured to verify one or more user authentication factors. Each authentication factor may be embodied as any type of authentication credential (e.g., password, passcode, biometric data, etc.) usable by the computing device 102 to authorize a user. For example, the authentication module 202 may verify a user password, passcode, personal identification number (PIN), or other user authentication credentials. In some embodiments, the authentication module 202 may verify a biometric factor such as a fingerprint pattern, iris pattern, retina pattern, or other biometric signature. The authentication module 202 may authenticate the user before allowing access to the computing device 102 (for example, before allowing the user to log in or before decrypting a sensitive file), before performing a financial transaction (e.g., before completing a sale, withdraw, funds transfer, or other financial transaction), or before performing any authenticated operation requested by the user.

The coercion detection module 204 is configured to analyze data from one or more of the sensors 134 to determine whether the user is authenticating under duress or is otherwise being coerced into authenticating to the computing device 102. The coercion detection module 204 may generate a coercion detection score indicative of the likelihood that the user is being coerced, and may compare that coercion detection score to a predefined threshold.

The security response module 206 is configured to perform one or more security operations if the user was likely coerced into performing the authentication, for example if the coercion detection score exceeds the threshold. In some embodiments, the security response module 206 may deny access to the user's data and instead provide access to false, but plausible data, such as a collection of non-sensitive documents or a false financial account. The security response module 206 may also be configured to perform a normal operation if the user was not likely coerced into performing the authentication, such as allowing normal access to user data or user accounts.

Still referring to FIG. 2, in an illustrative embodiment, the environment 200 of the computing device 102 may additionally or alternatively include the operating system 208 and the trusted execution environment 212. The trusted execution environment 212 includes a sensor module 214, a risk classifier module 216, a risk actuator module 218, and a reference server module 220. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 102. As such, in some embodiments, any one or more of the modules of the environment 200 may be embodied as a circuit or collection of electrical devices (e.g., a sensor circuit, a risk classifier circuit, etc.).

The operating system 208 may be embodied as any operating system, virtual machine monitor, hypervisor, or other control structure of the computing device 102. For example, the operating system 208 may be embodied as Microsoft® Windows™ or Linux®. The operating system 208 may execute and otherwise manage one or more applications 210. The operating system 208 and/or the applications 210 may include subsystems to provide authentication, anti-theft, intrusion detection, device configuration, power management, and/or other services to the computing device 102. Additionally or alternatively, some or all of those services may be provided by subsystems of the trusted execution environment 212.

The trusted execution environment 212 is configured to provide an isolated and secure execution environment within the environment 200. In some embodiments, the trusted execution environment 212 may be embodied as a software-based trusted execution environment; that is, a trusted execution environment that securely executes software using the processor 120 of the computing device 102. For example, the trusted execution environment 212 may be embodied as one or more secure enclaves established using the secure enclave support 122 of the processor 120, such as a secure enclave established using Intel® SGX technology. Additionally or alternatively, the trusted execution environment 212 may be embodied as a hardware-based trusted execution environment; that is, a trusted execution environment that securely executes independently of software executed by the processor 120. For example, the trusted execution environment 212 may be embodied using a coprocessor, out-of-band processor, or other component of the security engine 150.

The sensor module 214 is configured to monitor sensor data received from one or more sensors of the computing device 102. The sensor module 214 may monitor sensor data from "hard" sensors such as the sensors 134, the location circuitry 132, and/or the communication circuitry 130, or may monitor sensor data from "soft" sensors that derive signals from other sensors or other data sources of the computing device 102. For example, the sensor module 214 may monitor soft behavioral biometric data based on user activity while using the computing device 102.

The risk classifier module 216 is configured to apply a machine-learning classifier to the sensor data to identify an elevated risk of malicious attack to the computing device 102. For example, the risk classifier module 216 may identify patterns in the sensor data that have been observed shortly prior to and during malicious attack. The risk classifier module 216 may classify the data using a collection of threat reference data 222. The threat reference data 222 may identify sensor data patterns or other statistical information associated with both normal operation and operation during a malicious attack. As described below, the threat reference data 222 may he based on sensor data collected by the computing device 102 and/or on training data received from the reference server 104.

The risk actuator module 218 is configured to trigger a security response when an elevated risk has been detected. The risk actuator module 218 may cause the secure response to occur within the trusted execution environment 212. In some embodiments, the risk actuator module 218 may trigger or otherwise cause the operating system 208 and/or one or more applications 210 to perform the security response. The security response may include increasing authentication requirements, increasing security monitoring, or otherwise automatically adjusting security policies of the computing device 102.

The reference server module 220 is configured to establish a secure connection with the reference server 104. The reference server module 220 may receive training data for the machine-learning classifier through the secure connection. Additionally or alternatively, the reference server module 220 may transmit anonymized threat reference data 222 to the reference server 104 through the secure connection.

Still referring to FIG. 2, in the illustrative embodiment, the reference server 104 establishes an environment 240 during operation. The illustrative environment 240 includes a trusted communication module 242 and a threat analysis module 244. The various modules of the environment 240 may be embodied as hardware, firmware, software, or a combination thereof. For example the various modules, logic, and other components of the environment 240 may form a portion of, or otherwise be established by, the processor or other hardware components of the reference server 104. As such, in some embodiments, any one or more of the modules of the environment 240 may be embodied as a circuit or collection of electrical devices (e.g., a trusted communication circuit or a threat analysis circuit).

The trusted communication module 242 is configured to establish the secure connection with the computing device 102. The trusted communication module 242 may verify the authenticity of the trusted execution environment 212 of the computing device 102 when establishing the secure connection. The trusted communication module 242 may transmit threat training data 246 to the computing device 102 through the secure connection. Additionally or alternatively, the trusted communication module 242 may receive anonymized threat reference data from the computing device 102.

The threat analysis module 244 is configured to update the threat training data 246 based on the anonymized threat reference data received from one or more computing devices 102. Thus, the threat training data 246 may establish a centralized database of training information contributed from many different computing devices 102. After sufficient use, the threat training data 246 may identify statistically relevant patterns for normal use of a computing device 102 as well as malicious attacks against the computing device 102.

Figure 3:
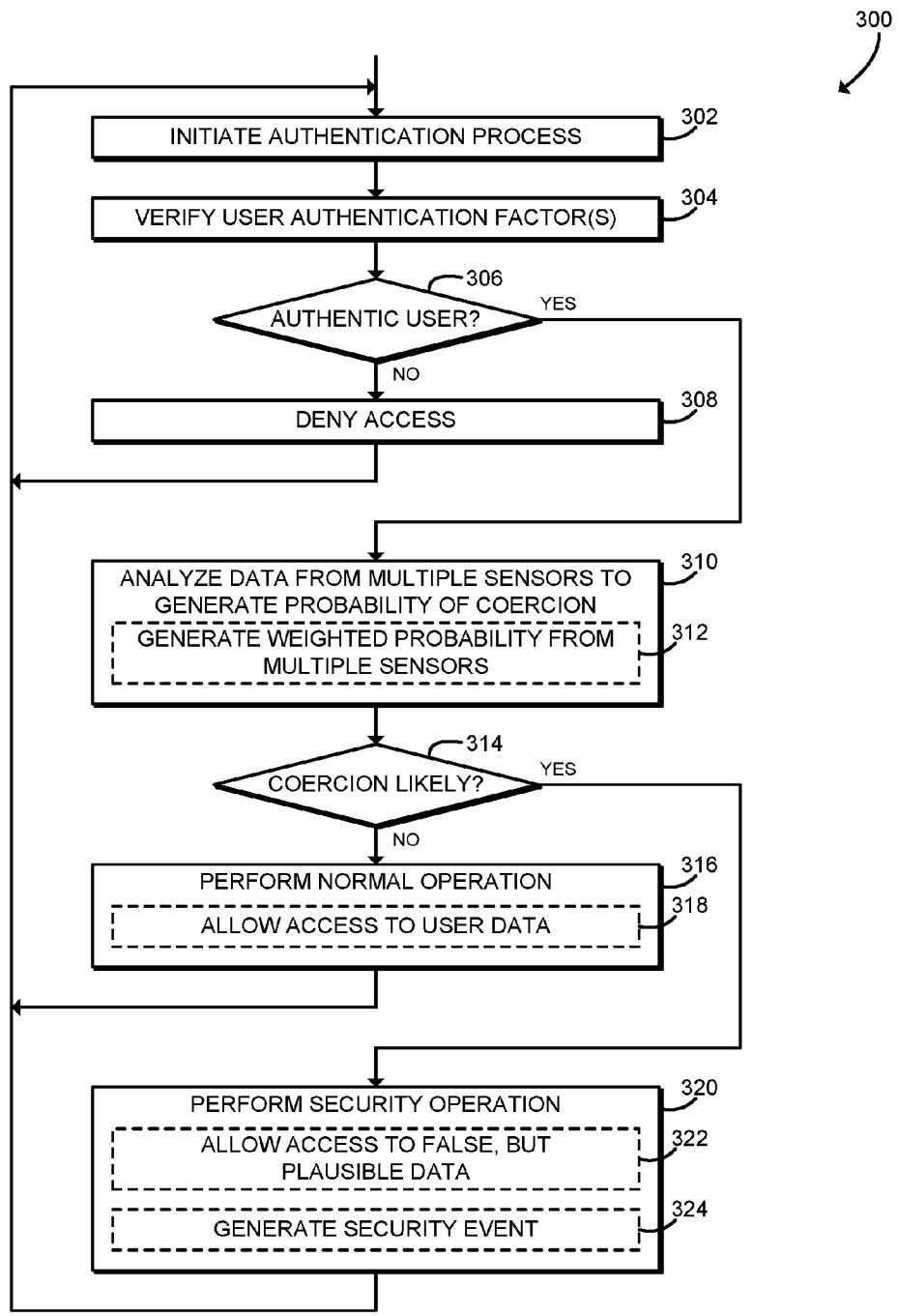
FIG. 3 is a simplified flow diagram of at least one embodiment of a method for coerced user authentication detection that may be executed by a computing device of the system of FIGS. 1 and 2.

Referring now to FIG. 3, in use, the computing device 102 may execute a method 300 for detecting coerced user authentication. The method 300 begins with block 302, in which the computing device 102 initiates an authentication process. The computing device 102 may initiate the authentication process in response to a user command or other user input event. For example, the computing device 102 may authenticate the user in response to a request to log in or otherwise access the computing device 102, a request to access data or decrypt encrypted files on the computing device 102, or a request for payment or another financial transaction (e.g., a request to withdraw funds from an ATM). In some embodiments, the computing device 102 may initiate the authentication process automatically upon detecting the user at the computing device 102.

In block 304, the computing device 102 verifies one or more user authentication factors. Authentication factors may be embodied as, for example, a user password, a personal identification number (PIN), a biometric authentication factor such as a fingerprint or facial recognition, or any other authentication factor. The computing device 102 may challenge the user to provide one or more user credentials or other authentication factors. In block 306, the computing device 102 determines whether the user has successfully authenticated, based on the authentication factors. If so, the method 300 branches ahead to block 310, described below. If not successfully authenticated, the method 300 advances to block 308.

In block 308, the computing device 102 denies access to the user. The computing device 102 may, for example, reject the user's login attempt, deny access to the requested data, deny the requested financial transaction, or otherwise deny access. After denying access, the method 300 loops back to block 302 to perform additional authentication.

Referring back to block 306, if the user successfully authenticates, the method 300 branches ahead to block 310, in which the computing device 102 analyzes sensor data received from one or more of the sensors 134 to determine the probability that the user is being coerced into performing authentication. The computing device 102 may analyze the sensor data to determine a physical condition of the user that may indicate whether the user is being coerced, such as the stress level of the user. The computing device 102 may determine a confidence measure associated with each of the sensors 134, which indicates the probability that the user is being coerced based on the sensor data received from the corresponding sensor 134. In some embodiments, in block 312, the computing device 102 may generate a weighted probability based on the confidence measures of all of the sensors 134. The probability may be weighted to favor more accurate sensors 134.

For example, the computing device 102 may analyze data from the camera 136 using a facial detection algorithm to determine the user's emotional state. The computing device 102 may use the emotional state to distinguish between stress and other emotional states with similar physiological responses. As another example, the computing device 102 may analyze data from the thermal imaging sensor 144 to detect the user's respiration rate and/or heart rate. Increased heart rate and respiration may be used as an indicator of stress. As an additional example, the computing device 102 may analyze data from the skin conductance sensor 146 to determine skin conductance, which is strongly correlated to human stress response and may act as a signal of the user's stress. Additionally, the computing device 102 may analyze data from the heart rate sensor 148 to determine heart rate, which is another signal that is correlated with stress. The skin conductance sensor 146 and/or the heart rate sensor 148 may be integrated with a PIN pad or other control surface of the computing device 102, which may allow the computing device 102 to inconspicuously monitor those sensors while the user inputs an authentication credential. As an additional example, the computing device 102 may analyze data from the voice sensor 138 to detect perturbations or other patterns in the user's voice that may indicate that the user is under stress.

In block 314, the computing device 102 determines whether the user is likely under coercion. The computing device 102 may, for example, determine whether the probability of coercion (or a weighted average probability of coercion) exceeds a predefined threshold probability. If the user is likely being coerced, the method 300 branches to block 320, described below. If the user is not likely being coerced, the method 300 advances to block 316.

In block 316, the computing device 102 allows normal access to the user. The computing device 102 may, for example, allow the user to log in to the computing device 102, decrypt encrypted user data, or complete a financial transaction. In some embodiments, in block 318, the computing device 102 may allow access to specified user data. User data may include sensitive information such as protected documents, bank account information, and/or any other protected information. After allowing access to the user, the method 300 loops back to block 302 to perform additional authentication.

Referring back to block 314, if coercion is likely, the method 300 branches ahead to block 320, in which the computing device 102 performs a security operation. The computing device 102 may perform any appropriate security operation in response to the detected likely coercion. In some embodiments, in block 322 the computing device 102 may allow access to false, but plausible data instead of allowing access to real user data. That is, the computing device 102 may allow access to false data that is configured to appear to be accurate data. For example, instead of allowing access to a user document, the computing device 102 may allow access to a different document (e.g., a document including publicly-available information, non-sensitive information, nonsense information, etc.). As another example, instead of allowing access to a user's bank account or other financial account, the computing device 102 may allow access to a false account that includes a relatively small balance amount. By presenting false but plausible information, the user's data may be protected and a malicious attacker may not suspect that a security operation has been performed. In some embodiments, in block 324 the computing device 102 may generate a security event such as an alarm, an alert, a log event, or other notification of the potential security breach. The computing device 102 may generate a silent or remote alarm to protect user safety. After performing the security operation, the method 300 loops back to block 302 to perform additional authentication.

Figure 4:
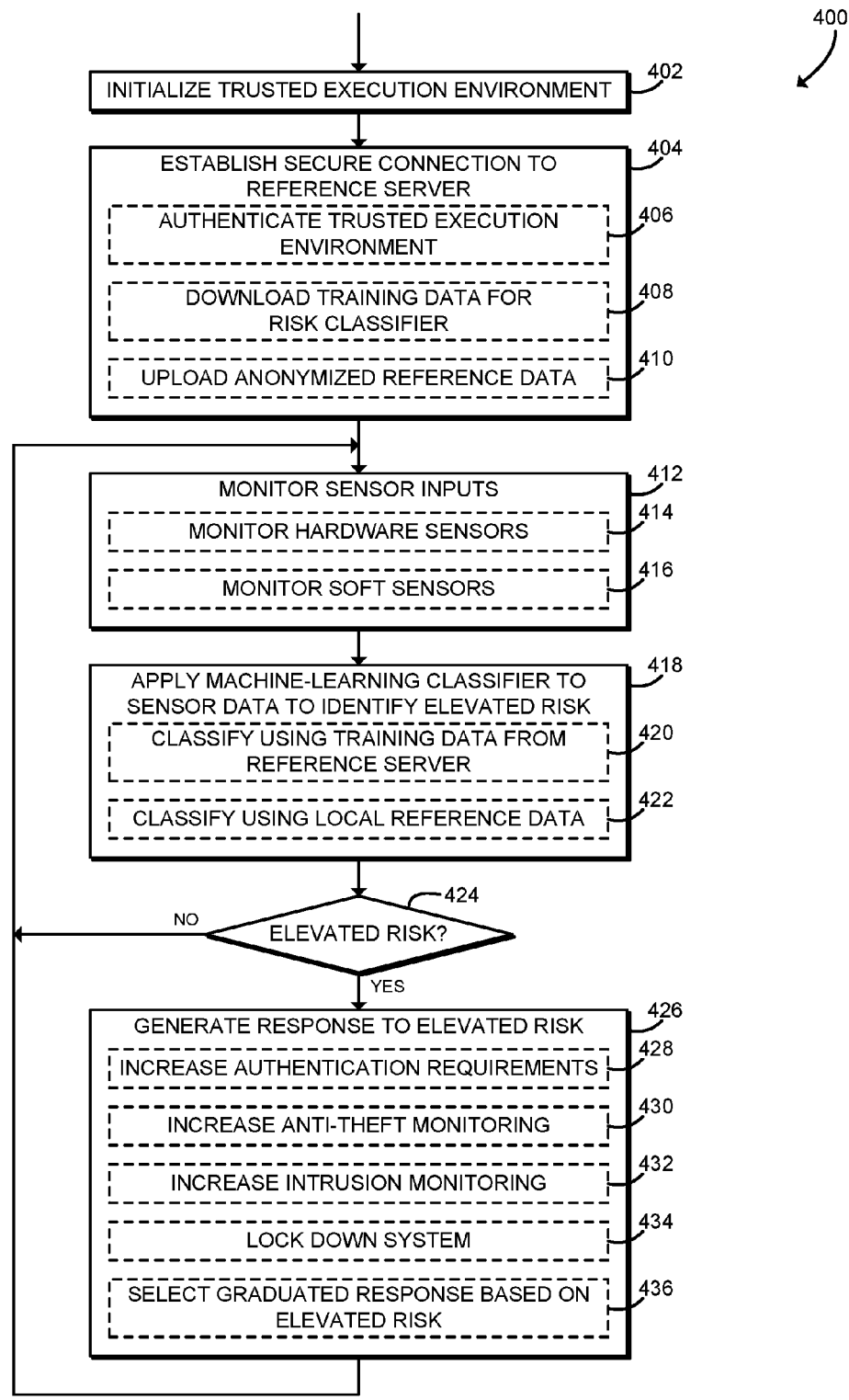
FIG. 4 is a simplified flow diagram of at least one embodiment of a method for elevated risk monitoring and response that may be executed by a computing device of the system of FIGS. 1 and 2.

Referring now to FIG. 4, in use, the computing device 102 may execute a method 400 for elevated risk monitoring. The method 400 begins with block 402, in which the computing device 102 initializes the trusted execution environment 212. The computing device 102 may use any appropriate technique to initialize the trusted execution environment 212. For example, the computing device 102 may establish one or more secure enclaves within the memory 126 using the secure enclave support 122 of the processor 120. To establish a secure enclave, the computing device 102 may execute one or more processor instructions to create the secure enclave, add memory pages to the secure enclave, and finalize measurements of the secure enclave. The secure enclave may be established, for example, using Intel® SGX technology. Additionally or alternatively, the computing device 102 may initialize the trusted execution environment 212 using a coprocessor, out-of-band processor, or other component of the security engine 150. For example, in some embodiments, the computing device 102 may generate a network request, local socket connection, HECI bus message, or other message to the security engine 150 to initialize the trusted execution environment 212. After being initialized, the remaining processes of the method 400 may execute from within the trusted execution environment 212.

In block 404, the computing device 102 establishes a secure connection with the reference server 104. The computing device 102 may use any technique to establish the connection that preserves the security and/or anonymity of sensor data stored by the computing device 102. For example, the computing device 102 may open a connection using the Sign-and-MAC (SIGMA) protocol. In some embodiments, in block 406 the computing device 102 may authenticate the trusted execution environment 212 to the reference server 104. For example, the computing device 102 may attest, measure, sign, or otherwise prove that the trusted execution environment 212 has not been altered. In some embodiments, in block 408 the computing device 102 may download threat training data 246 via the secure connection. As described below, the threat training data 246 may be used to configure the machine-learning classifier used to identify elevated risk. In some embodiments, in block 410 the computing device 102 may upload anonymized threat reference data 222 via the secure connection. As described below, the threat reference data 222 is indicative of sensor data recorded during normal operation and/or during a malicious attack, and may be used by the reference server 104 to produce the threat training data 246.

In block 412, the computing device 102 monitors sensor inputs from the sensors 134. The computing device 102 may record or otherwise monitor the sensor inputs while in a low-power state, for example using an integrated sensor hub included in an SoC of the computing device 102. To protect the privacy and/or security of the sensor data, the computing device 102 monitors the sensor data within the trusted execution environment 212. The sensor data may also be received using one or more trusted I/O paths. In some embodiments, in block 414 the computing device 102 may monitor one or more hardware sensors, such as one or more of the sensors 134, the location circuitry 132, and/or the communication circuitry 130. In some embodiments, in block 416, the computing device 102 may monitor one or more soft sensors. A soft sensor may be embodied as a hardware, software, or firmware component of the computing device 102 that determines one or more sensor signals based on input data such as sensor data from another sensor or user activity data of the computing device 102. For example, the computing device 102 may monitor a soft behavioral biometrics sensor that identifies the user based on user activity patterns (e.g., application usage, user interface input patterns, gait, etc.).

In block 418, the computing device 102 applies a machine-learning classifier to the sensor data to identify an elevated risk of malicious attack to the computing device 102. The computing device 102, for example, may use a fraud detection classifier to identify potential fraud concerning user identification or authentication. The computing device 102 may perform a statistical analysis of the sensor data to identify and classify patterns associated with normal operation and malicious attack. The computing device 102 may primarily detect patterns observed just prior to and during a malicious attack. The computing device 102 may attempt to detect any malicious attack such as attempted authentication fraud or spoofing, theft, physical intrusion, network intrusion, or other attacks. The machine-learning classifier may generate a score that indicates the likelihood of a malicious attack. The machine-learning classifier may be trained or otherwise prepared for use using sensor data collected by the computing device 102 and/or by other remote computing devices. In some embodiments, the computing device 102 may associate new or unknown patterns with an elevated risk of attack. In some embodiments, the user may also train the computing device 102 for desired behavior. For example, in an unfamiliar context (e.g., an unfamiliar place or time to perform a task), the computing device 102 may prompt the user to authenticate with strong credentials before accepting the training data.

In some embodiments, in block 420 the computing device 102 may perform classification using the threat training data 246 received from the reference server 104. As described above, the threat training data 246 may be derived from multiple remote computing devices and thus may allow the computing device 102 to perform high-quality classifications without extensive training by the user. In some embodiments, in block 422 the computing device 102 may perform classification using the threat reference data 222. The threat reference data 222 may have been stored and refined in previous invocations of the machine-learning classifier, and thus may adapt to the user's behavior. To protect the privacy and/or security of the user data, the computing device 102 applies the machine-learning classifier within the trusted execution environment 212.

In block 424, the computing device 102 determines whether elevated risk of attack exists based on the machine-learning classifier output. The computing device 102 may determine, for example, if the risk of attack exceeds a predefined threshold, or may determine if any amount of atypical risk exists. If no elevated risk of attack exists, the method 400 loops back to block 412 to continue monitoring sensor inputs. If elevated risk of attack exists, the method 400 advances to block 426, in which the computing device 102 generates a security response to the elevated risk. The computing device 102 may, for example, from within the trusted execution environment 212 trigger a security response in another component of the computing device 102, such as the operating system 208 and/or one or more applications 210. In general, to respond to the elevated risk of attack, the computing device 102 may increase sensor monitoring, attack detection, attack countermeasures, or other activities intended to prevent, detect, or ameliorate a potential attack. As a result, during periods of elevated risk of attack, the computing device 102 may increase power consumption of the computing device 102 or otherwise override power/performance optimization rules in return for more effective anti-attack activities.

In some embodiments, in block 428 the computing device 102 may increase authentication requirements in response to detecting elevated risk. For example, the computing device 102 may require one or more additional authentication factors (e.g., an additional password, pass code, biometric factor, authentication token, etc.). In some embodiments, the computing device 102 may not require additional authentication input from the user but may enable one or more additional passive authentication techniques, such as behavioral biometric authentication. As another example, the computing device 102 may use an additional authentication technique that is more resistant to fraud but has a higher likelihood of refusing a match. For example, in response to detecting elevated risk, the computing device 102 may increase a matching threshold for a biometric scanner such as a fingerprint reader, which may increase the security of the authentication but also may increase the likelihood that the actual user would be rejected. As another example, in response to detecting elevated risk, the computing device 102 may counter-weight user presence confidence scores. Because the authentication requirements are increased only when elevated risk is detected, the user may not be inconvenienced in most circumstances (without elevated risk). Additionally, failed risk detection (i.e., incorrectly determining that elevated risk exists) may result only in a change in authentication requirements and thus may have reasonable consequences.

Similarly, in some embodiments, in block 430 the computing device 102 may increase anti-theft monitoring in response to detecting elevated risk. For example, the computing device 102 may activate the location circuitry 132 or other radio circuitry in response to detecting elevated risk. In some embodiments, in block 432 the computing device 102 may increase intrusion monitoring in response to detecting elevated risk. In some embodiments, in block 434 the computing device 102 may lock down the system in response to detecting elevated risk. For example, the computing device 102 may display a lock screen and require a password or other authentication factors to access the computing device 102. In some embodiments, the computing device 102 may trigger an advanced configuration and power interface (ACPI) power management subsystem or other component to physically power down or otherwise disable the computing device 102.

In some embodiments, in block 436, the computing device 102 may select a graduated security response based on the elevated risk. For example, the computing device 102 may transmit a weighted score or other value indicative of the severity of the elevated risk to various subsystems of the computing device 102 (e.g., the authentication subsystem, anti-theft subsystem, intrusion monitoring subsystem, power management subsystem, etc.). The subsystems of the computing device 102 may adjust security policies based on the weighted score. For example, a contextual authentication subsystem may require stronger authentication rules based on the weighted score. As another example, the computing device 102 may activate particular security responses based on the particular type of suspected attack. For example, the computing device 102 may activate a particular authentication method based on known resilience to the suspected attack type. As another example, the weighted risk score may be provided to one or more other machine-learning classifiers of the computing device 102 to tune the behavior of those classifiers. For example, the weighted risk score may counter-weight the aggressiveness or change model parameters associated with another machine learning classifier of the computing device 102, such as a fingerprint classifier. After generating the security response, the method 400 loops back to block 412 to continue monitoring sensor inputs.

Figure 5:
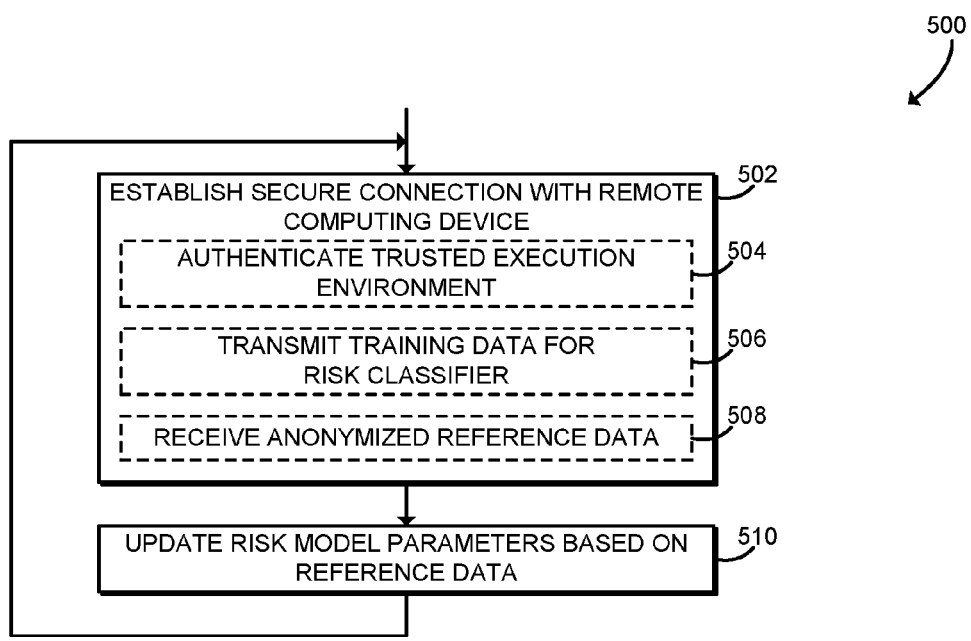
FIG. 5 is a simplified flow diagram of at least one embodiment of a method for elevated risk analysis that may be executed by a reference server of the system of FIGS. 1 and 2.

Referring now to FIG. 5, in use, the reference server 104 may execute a method 500 for elevated risk analysis. The method 500 begins with block 502, in which the reference server 104 establishes a secure connection with a computing device 102. The reference server 104 may use any technique to establish the connection that preserves the security and/or anonymity of sensor data stored by the computing device 102. For example, the reference server 104 may open a connection using the Sign-and-MAC (SIGMA) protocol. In some embodiments, in block 504 the reference server 104 may authenticate the trusted execution environment 212 of computing device 102. For example, the computing device 102 may attest, measure, sign, or otherwise prove to the reference server 104 that its trusted execution environment 212 has not been altered. By authenticating the trusted execution environment 212, the reference server 104 may be assured that any sensitive data included in the threat training data 246 will not be compromised by the computing device 102. In some embodiments, in block 506 the reference server 104 may transmit threat training data 246 to the computing device 102 via the secure connection. As described above, the threat training data 246 may be used by the computing device 102 to configure the machine-learning classifier used to identify elevated risk. In some embodiments, in block 508 the reference server 104 may receive anonymized threat reference data 222 from the computing device 102 via the secure connection. The threat reference data 222 is indicative of sensor data recorded during normal operation of the computing device 102 and/or during a malicious attack against the computing device 102.

In block 510, the reference server 104 updates the threat training data 246 based on the threat reference data 222 received from the computing device 102. The reference server 104 may perform anomaly analysis over threat reference data 222 received from several computing devices 102. Thus, the reference server 104 may identify patterns associated with normal operation and/or malicious attacks based on sensor data sourced from numerous computing devices 102. After updating the threat training data 246, the method 500 loops back to block 502, in which the reference server 104 may establish another secure connection with the computing device 102 and/or another computing device 102. Thus, patterns associated with malicious attacks may be discovered and distributed to many computing devices 102 without requiring lengthy individualized training for each computing device 102.

EXAMPLES

Illustrative examples of the technologies disclosed herein are provided below. An embodiment of the technologies may include any one or more, and any combination of, the examples described below.

Example 1 includes a computing device for coerced authentication response, the computing device comprising an authentication module to verify a user authentication factor provided by a user; a coercion detection module to (i) analyze sensor data to generate a coercion detection score in response to verifying the user authentication factor, wherein the sensor data is indicative of a physical condition of the user of the computing device while the user provided the user authentication factor, and (ii) determine whether the coercion detection score has a predetermined relationship to a threshold coercion detection score; and a security response module to perform a security operation in response to a determination that the coercion detection score has the predetermined relationship to the threshold coercion detection score.

Example 2 includes the subject matter of Example 1, and wherein the user authentication factor comprises a user password.

Example 3 includes the subject matter of any of Examples 1 and 2, and wherein the user authentication factor comprises a biometric factor.

Example 4 includes the subject matter of any of Examples 1-3, and wherein to analyze the sensor data to generate the coercion detection score comprises to analyze sensor data from a plurality of sensors of the computing device; and determine a confidence measure for each sensor of the plurality of sensors, wherein each confidence measure is indicative of a probability that the sensor data from the corresponding sensor is indicative of coercion of the user.

Example 5 includes the subject matter of any of Examples 1-4, and wherein to analyze the sensor data to generate the coercion detection score further comprises to determine a weighted average of the plurality of confidence measures.

Example 6 includes the subject matter of any of Examples 1-5, and further including a camera, wherein the sensor data comprises camera data indicative of a facial expression of the user.

Example 7 includes the subject matter of any of Examples 1-6, and further including an audio sensor, wherein the sensor data comprises audio sensor data indicative of a voice pattern of the user.

Example 8 includes the subject matter of any of Examples 1-7, and further including a thermal imaging sensor, wherein the sensor data comprises thermal imaging sensor data indicative of a heart rate or a respiration rate of the user.

Example 9 includes the subject matter of any of Examples 1-8, and further including a skin conductance sensor, wherein the sensor data comprises skin conductance sensor data indicative of a skin conductance of the user.

Example 10 includes the subject matter of any of Examples 1-9, and further including a heart rate sensor, wherein the sensor data comprises heart rate sensor data indicative of a heart rate of the user.

Example 11 includes the subject matter of any of Examples 1-10, and wherein to perform the security operation comprises to deny access to user data; and allow access to false data configured to appear to be accurate data.

Example 12 includes the subject matter of any of Examples 1-11, and wherein to perform the security operation comprises to generate a security event.

Example 13 includes the subject matter of any of Examples 1-12, and wherein the security response module is further to perform a standard operation in response to a determination that the coercion detection score does not have the predetermined relationship to the threshold coercion detection score.

Example 14 includes a computing device for elevated risk response, the computing device comprising a sensor module to monitor, by a trusted execution environment, sensor data from a plurality of sensors of the computing device; a risk classifier module to apply, by the trusted execution environment, a machine-learning classifier to the sensor data to identify an elevated risk of malicious attack to the computing device; and a risk actuator module to trigger, by the trusted execution environment, a security response in response to identification of the elevated risk.

Example 15 includes the subject matter of Example 14, and wherein the sensor data comprises location data indicative of a location of the computing device.

Example 16 includes the subject matter of any of Examples 14 and 15, and wherein the sensor data comprises soft behavioral biometric data indicative of usage of the computing device by a user.

Example 17 includes the subject matter of any of Examples 14-16, and wherein to trigger the security response comprises to cause, by the trusted execution environment, an operating system or an application of the computing device to perform the security response.

Example 18 includes the subject matter of any of Examples 14-17, and wherein to trigger the security response comprises to power on, by the computing device, one or more additional sensor of the computing device in response to the identification of the elevated risk.

Example 19 includes the subject matter of any of Examples 14-18, and wherein the one or more additional sensor comprises a motion sensor, a radio communication subsystem, a location sensor, a camera, or a microphone.

Example 20 includes the subject matter of any of Examples 14-19, and wherein to trigger the security response comprises to select a security response based on the elevated risk.

Example 21 includes the subject matter of any of Examples 14-20, and wherein to trigger the security response comprises to increase, by the computing device, an authentication requirement of the computing device in response to the identification of the elevated risk.

Example 22 includes the subject matter of any of Examples 14-21, and wherein to increase the authentication requirement comprises to require an additional authentication factor from the user.

Example 23 includes the subject matter of any of Examples 14-22, and wherein to trigger the security response comprises to increase anti-theft monitoring by the computing device in response to the identification of the elevated risk.

Example 24 includes the subject matter of any of Examples 14-23, and wherein to trigger the security response comprises to increase intrusion monitoring by the computing device in response to the identification of the elevated risk.

Example 25 includes the subject matter of any of Examples 14-24, and wherein to trigger the security response comprises to restrict user access to the computing device in response to the identification of the elevated risk.

Example 26 includes the subject matter of any of Examples 14-25, and further including a reference server module to establish, by the trusted execution environment, a secure connection with a reference server; and receive, by the trusted execution environment, training data for the machine-learning classifier via the secure connection; wherein to apply the machine-learning classifier to the sensor data comprises to supply the training data to the machine-learning classifier.

Example 27 includes the subject matter of any of Examples 14-26, and wherein the risk classifier module is further to generate, by the trusted execution environment, threat reference data in response to application of the machine-learning classifier, wherein the reference data is indicative of normal usage of the computing device or malicious attack of the computing device; and the reference server module is further to (i) anonymize, by the trusted execution environment, the threat reference data to generate anonymized reference data and (ii) transmit, by the trusted execution environment, the anonymized reference data to the reference server via the secure connection.

Example 28 includes the subject matter of any of Examples 14-27, and wherein to establish the secure connection further comprises to authenticate the trusted execution environment with the reference server.

Example 29 includes the subject matter of any of Examples 14-28, and further including a processor having a secure enclave, the secure enclave to establish the trusted execution environment.

Example 30 includes the subject matter of any of Examples 14-29, and further including a security engine to establish the trusted execution environment.

Example 31 includes a computing device for elevated risk analysis, the computing device comprising a trusted communication module to (i) establish a secure connection with a trusted execution environment of a remote computing device and (ii) receive, via the secure connection, threat reference data indicative of normal usage of the remote computing device or malicious attack of the computing device; and a threat analysis module to update training data for a machine learning classifier to identify elevated risk of malicious attack to the remote computing device, based on the threat reference data.

Example 32 includes the subject matter of Example 31, and wherein to establish the secure connection further comprising to authenticate the trusted execution environment of the remote computing device.

Example 33 includes the subject matter of any of Examples 31 and 32, and wherein the trusted communication module is further to establish a second secure connection with a trusted execution environment of a second remote computing device; and transmit the training data for the machine-learning classifier via the second secure connection in response to an update of the training data.

Example 34 includes a method for coerced authentication response, the method comprising verifying, by a computing device, a user authentication factor provided by a user; analyzing, by the computing device, sensor data to generate a coercion detection score in response to verifying the user authentication factor, wherein the sensor data is indicative of a physical condition of the user of the computing device while the user is providing the authentication factor; determining, by the computing device, whether the coercion detection score has a predetermined relationship to a threshold coercion detection score; and performing, by the computing device, a security operation in response to determining the coercion detection score has the predetermined relationship to the threshold coercion detection score.

Example 35 includes the subject matter of Example 34, and wherein verifying the user authentication factor comprises verifying a user password.

Example 36 includes the subject matter of any of Examples 34 and 35, and wherein verifying the user authentication factor comprises verifying a biometric factor.

Example 37 includes the subject matter of any of Examples 34-36, and wherein analyzing the sensor data to generate the coercion detection score comprises analyzing sensor data from a plurality of sensors of the computing device; and determining a confidence measure for each sensor of the plurality of sensors, wherein each confidence measure is indicative of a probability that the sensor data from the corresponding sensor is indicative of coercion of the user.

Example 38 includes the subject matter of any of Examples 34-37, and wherein analyzing the sensor data to generate the coercion detection score further comprises determining a weighted average of the plurality of confidence measures.

Example 39 includes the subject matter of any of Examples 34-38, and wherein analyzing the sensor data to generate the coercion detection score comprises analyzing camera data indicative of a facial expression of the user.

Example 40 includes the subject matter of any of Examples 34-39, and wherein analyzing the sensor data to generate the coercion detection score comprises analyzing audio sensor data indicative of a voice pattern of the user.

Example 41 includes the subject matter of any of Examples 34-40, and wherein analyzing the sensor data to generate the coercion detection score comprises analyzing thermal imaging sensor data indicative of a heart rate or a respiration rate of the user.

Example 42 includes the subject matter of any of Examples 34-41, and wherein analyzing the sensor data to generate the coercion detection score comprises analyzing skin conductance sensor data indicative of a skin conductance of the user.

Example 43 includes the subject matter of any of Examples 34-42, and wherein analyzing the sensor data to generate the coercion detection score comprises analyzing heart rate sensor data indicative of a heart rate of the user.

Example 44 includes the subject matter of any of Examples 34-43, and wherein performing the security operation comprises denying access to user data; and allowing access to false data configured to appear to be accurate data.

Example 45 includes the subject matter of any of Examples 34-44, and wherein performing the security operation comprises generating a security event.

Example 46 includes the subject matter of any of Examples 34-45, and further comprising performing a standard operation in response to determining the coercion detection score does not have the predetermined relationship to the threshold coercion detection score.

Example 47 includes a method for elevated risk monitoring, the method comprising monitoring, by a trusted execution environment of a computing device, sensor data from a plurality of sensors of the computing device; applying, by the trusted execution environment, a machine-learning classifier to the sensor data to identify an elevated risk of malicious attack to the computing device; and identifying, by the trusted execution environment, the elevated risk of malicious attack in response to applying the machine-learning classifier; and triggering, by the trusted execution environment, a security response in response to identifying the elevated risk.

Example 48 includes the subject matter of Example 47, and wherein monitoring the sensor data comprises monitoring location data indicative of a location of the computing device.

Example 49 includes the subject matter of any of Examples 47 and 48, and wherein monitoring the sensor data comprises monitoring soft behavioral biometric data indicative of usage of the computing device by a user.

Example 50 includes the subject matter of any of Examples 47-49, and wherein triggering the security response comprises causing, by the trusted execution environment, an operating system or an application of the computing device to perform the security response.

Example 51 includes the subject matter of any of Examples 47-50, and wherein triggering the security response comprises powering on, by the computing device, one or more additional sensor of the computing device in response to identifying the elevated risk.

Example 52 includes the subject matter of any of Examples 47-51, and wherein powering on the one or more additional sensor comprises powering on a motion sensor, a radio communication subsystem, a location sensor, a camera, or a microphone.

Example 53 includes the subject matter of any of Examples 47-52, and wherein triggering the security response comprises selecting a security response based on the elevated risk.

Example 54 includes the subject matter of any of Examples 47-53, and wherein triggering the security response comprises increasing, by the computing device, an authentication requirement of the computing device in response to identifying the elevated risk.

Example 55 includes the subject matter of any of Examples 47-54, and wherein increasing the authentication requirement comprises requiring an additional authentication factor from the user.

Example 56 includes the subject matter of any of Examples 47-55, and wherein triggering the security response comprises increasing anti-theft monitoring by the computing device in response to identifying the elevated risk.

Example 57 includes the subject matter of any of Examples 47-56, and wherein triggering the security response comprises increasing intrusion monitoring by the computing device in response to identifying the elevated risk.

Example 58 includes the subject matter of any of Examples 47-57, and wherein triggering the security response comprises restricting user access to the computing device in response to identifying the elevated risk.

Example 59 includes the subject matter of any of Examples 47-58, and further including establishing, by the trusted execution environment, a secure connection with a reference server; and receiving, by the trusted execution environment, training data for the machine-learning classifier via the secure connection; wherein applying the machine-learning classifier to the sensor data comprises supplying the training data to the machine-learning classifier.

Example 60 includes the subject matter of any of Examples 47-59, and further including generating, by the trusted execution environment, threat reference data in response to applying the machine-learning classifier, wherein the reference data is indicative of normal usage of the computing device or malicious attack of the computing device; anonymizing, by the trusted execution environment, the threat reference data to generate anonymized reference data; and transmitting, by the trusted execution environment, the anonymized reference data to the reference server via the secure connection.

Example 61 includes the subject matter of any of Examples 47-60, and wherein establishing the secure connection further comprises authenticating the trusted execution environment with the reference server.

Example 62 includes the subject matter of any of Examples 47-61, and further including establishing, by the computing device, the trusted execution environment with a secure enclave of a processor of the computing device.

Example 63 includes the subject matter of any of Examples 47-62, and further including establishing, by the computing device, the trusted execution environment with a security engine of the computing device.

Example 64 includes a method for elevated risk analysis, the method comprising establishing, by a reference server, a secure connection with a trusted execution environment of a computing device; receiving, by the reference server via the secure connection, threat reference data indicative of normal usage of the computing device or malicious attack of the computing device; updating, by the reference server, training data for a machine learning classifier to identify elevated risk of malicious attack to the computing device, based on the threat reference data.

Example 65 includes the subject matter of Example 64, and wherein establishing the secure connection further comprising authenticating the trusted execution environment of the computing device.

Example 66 includes the subject matter of any of Examples 64 and 65, and further including establishing, by the reference server, a second secure connection with a trusted execution environment of a second computing device; and transmitting, by the reference server, the training data for the machine-learning classifier via the second secure connection in response to updating the training data.

Example 67 includes a computing device comprising a processor; and a memory having stored therein a plurality of instructions that when executed by the processor cause the computing device to perform the method of any of Examples 34-66.

Example 68 includes one or more machine readable storage media comprising a plurality of instructions stored thereon that in response to being executed result in a computing device performing the method of any of Examples 34-66.

Example 69 includes a computing device comprising means for performing the method of any of Examples 34-66.

Example 70 includes a computing device for coerced authentication response, the computing device comprising means for verifying a user authentication factor provided by a user; means for analyzing sensor data to generate a coercion detection score in response to verifying the user authentication factor, wherein the sensor data is indicative of a physical condition of the user of the computing device while the user is providing the authentication factor; means for determining whether the coercion detection score has a predetermined relationship to a threshold coercion detection score; and means for performing a security operation in response to determining the coercion detection score has the predetermined relationship to the threshold coercion detection score.

Example 71 includes the subject matter of Example 70, and wherein the means for verifying the user authentication factor comprises means for verifying a user password.

Example 72 includes the subject matter of any of Examples 70 and 71, and wherein the means for verifying the user authentication factor comprises means for verifying a biometric factor.

Example 73 includes the subject matter of any of Examples 70-72, and wherein the means for analyzing the sensor data to generate the coercion detection score comprises means for analyzing sensor data from a plurality of sensors of the computing device; and means for determining a confidence measure for each sensor of the plurality of sensors, wherein each confidence measure is indicative of a probability that the sensor data from the corresponding sensor is indicative of coercion of the user.

Example 74 includes the subject matter of any of Examples 70-73, and wherein the means for analyzing the sensor data to generate the coercion detection score further comprises means for determining a weighted average of the plurality of confidence measures.

Example 75 includes the subject matter of any of Examples 70-74, and wherein the means for analyzing the sensor data to generate the coercion detection score comprises means for analyzing camera data indicative of a facial expression of the user.

Example 76 includes the subject matter of any of Examples 70-75, and wherein the means for analyzing the sensor data to generate the coercion detection score comprises means for analyzing audio sensor data indicative of a voice pattern of the user.

Example 77 includes the subject matter of any of Examples 70-76, and wherein the means for analyzing the sensor data to generate the coercion detection score comprises means for analyzing thermal imaging sensor data indicative of a heart rate or a respiration rate of the user.

Example 78 includes the subject matter of any of Examples 70-77, and wherein the means for analyzing the sensor data to generate the coercion detection score comprises means for analyzing skin conductance sensor data indicative of a skin conductance of the user.

Example 79 includes the subject matter of any of Examples 70-78, and wherein the means for analyzing the sensor data to generate the coercion detection score comprises means for analyzing heart rate sensor data indicative of a heart rate of the user.

Example 80 includes the subject matter of any of Examples 70-79, and wherein the means for performing the security operation comprises means for denying access to user data; and means for allowing access to false data configured to appear to be accurate data.

Example 81 includes the subject matter of any of Examples 70-80, and wherein the means for performing the security operation comprises means for generating a security event.

Example 82 includes the subject matter of any of Examples 70-81, and further including means for performing a standard operation in response to determining the coercion detection score does not have the predetermined relationship to the threshold coercion detection score.

Example 83 includes a computing device for elevated risk monitoring, the computing device comprising means for monitoring, by a trusted execution environment of the computing device, sensor data from a plurality of sensors of the computing device; means for applying, by the trusted execution environment, a machine-learning classifier to the sensor data to identify an elevated risk of malicious attack to the computing device; and means for identifying, by the trusted execution environment, the elevated risk of malicious attack in response to applying the machine-learning classifier; and means for triggering, by the trusted execution environment, a security response in response to identifying the elevated risk.

Example 84 includes the subject matter of Example 83, and wherein the means for monitoring the sensor data comprises means for monitoring location data indicative of a location of the computing device.

Example 85 includes the subject matter of any of Examples 83 and 84, and wherein the means for monitoring the sensor data comprises means for monitoring soft behavioral biometric data indicative of usage of the computing device by a user.

Example 86 includes the subject matter of any of Examples 83-85, and wherein the means for triggering the security response comprises means for causing, by the trusted execution environment, an operating system or an application of the computing device to perform the security response.

Example 87 includes the subject matter of any of Examples 83-86, and wherein the means for triggering the security response comprises means for powering on one or more additional sensor of the computing device in response to identifying the elevated risk.

Example 88 includes the subject matter of any of Examples 83-87, and wherein the means for powering on the one or more additional sensor comprises means for powering on a motion sensor, a radio communication subsystem, a location sensor, a camera, or a microphone.

Example 89 includes the subject matter of any of Examples 83-88, and wherein the means for triggering the security response comprises means for selecting a security response based on the elevated risk.

Example 90 includes the subject matter of any of Examples 83-89, and wherein the means for triggering the security response comprises means for increasing an authentication requirement of the computing device in response to identifying the elevated risk.

Example 91 includes the subject matter of any of Examples 83-90, and wherein the means for increasing the authentication requirement comprises means for requiring an additional authentication factor from the user.

Example 92 includes the subject matter of any of Examples 83-91, and wherein the means for triggering the security response comprises means for increasing anti-theft monitoring by the computing device in response to identifying the elevated risk.

Example 93 includes the subject matter of any of Examples 83-92, and wherein the means for triggering the security response comprises means for increasing intrusion monitoring by the computing device in response to identifying the elevated risk.

Example 94 includes the subject matter of any of Examples 83-93, and wherein the means for triggering the security response comprises means for restricting user access to the computing device in response to identifying the elevated risk.

Example 95 includes the subject matter of any of Examples 83-94, and further including means for establishing, by the trusted execution environment, a secure connection with a reference server; and means for receiving, by the trusted execution environment, training data for the machine-learning classifier via the secure connection; wherein the means for applying the machine-learning classifier to the sensor data comprises means for supplying the training data to the machine-learning classifier.

Example 96 includes the subject matter of any of Examples 83-95, and further including means for generating, by the trusted execution environment, threat reference data in response to applying the machine-learning classifier, wherein the reference data is indicative of normal usage of the computing device or malicious attack of the computing device; means for anonymizing, by the trusted execution environment, the threat reference data to generate anonymized reference data; and means for transmitting, by the trusted execution environment, the anonymized reference data to the reference server via the secure connection.

Example 97 includes the subject matter of any of Examples 83-96, and wherein the means for establishing the secure connection further comprises means for authenticating the trusted execution environment with the reference server.

Example 98 includes the subject matter of any of Examples 83-97, and further including means for establishing the trusted execution environment with a secure enclave of a processor of the computing device.

Example 99 includes the subject matter of any of Examples 83-98, and further including means for establishing the trusted execution environment with a security engine of the computing device.

Example 100 includes a computing device for elevated risk analysis, the computing device comprising means for establishing a secure connection with a trusted execution environment of a remote computing device; means for receiving, via the secure connection, threat reference data indicative of normal usage of the remote computing device or malicious attack of the remote computing device; means for updating, by the reference server, training data for a machine learning classifier to identify elevated risk of malicious attack to the remote computing device, based on the threat reference data.

Example 101 includes the subject matter of Example 100, and wherein the means for establishing the secure connection further comprising means for authenticating the trusted execution environment of the remote computing device.

Example 102 includes the subject matter of any of Examples 100 and 101, and further including means for establishing a second secure connection with a trusted execution environment of a second remote computing device; and means for transmitting the training data for the machine-learning classifier via the second secure connection in response to updating the training data.

The invention claimed is:

1. A computing device for elevated risk response, the computing device comprising:
a processor; and
one or more memory devices having stored therein a plurality of instructions that, when executed by the processor, cause the computing device to:
monitor, by a trusted execution environment, sensor data from a plurality of sensors of the computing device, wherein the sensor data is indicative of a physical condition of a user of the computing device;
apply, by the trusted execution environment, a machine-learning classifier to the sensor data to identify an elevated risk of malicious attack to the computing device, wherein the elevated risk is based on the physical condition of the user of the computing device;
trigger, by the trusted execution environment, a security response in response to identification of the elevated risk;
establish, by the trusted execution environment, a secure connection with a reference server; and
receive, by the trusted execution environment, training data for the machine learning classifier via the secure connection; wherein to apply the machine-learning classifier to the sensor data comprises to supply the training data to the machine-learning classifier.

2. The computing device of claim 1, wherein the sensor data comprises location data indicative of a location of the computing device.

3. The computing device of claim 1, wherein the sensor data comprises soft behavioral biometric data indicative of usage of the computing device by a user.

4. The computing device of claim 1, wherein to trigger the security response comprises to power on, by the computing device, one or more additional sensor of the computing device in response to the identification of the elevated risk.

5. The computing device of claim 1, wherein to trigger the security response comprises to select a security response based on the elevated risk.

6. The computing device of claim 1, wherein to trigger the security response comprises to increase, by the computing device, an authentication requirement of the computing device in response to the identification of the elevated risk.

7. The computing device of claim 1, wherein to trigger the security response comprises to:
increase anti-theft monitoring by the computing device m response to the identification of the elevated risk; or
increase intrusion monitoring by the computing device m response to the identification of the elevated risk.

8. The computing device of claim 1, wherein to trigger the security response comprises to restrict user access to the computing device in response to the identification of the elevated risk.

9. The computing device of claim 1, wherein the one or more memory devices further comprise a plurality of instructions that when executed cause the computing device to:
generate, by the trusted execution environment, threat reference data in response to application of the machine-learning classifier, wherein the reference data is indicative of normal usage of the computing device or malicious attack of the computing device;
anonymize, by the trusted execution environment, the threat reference data to generate anonymized reference data; and transmit, by the trusted execution environment, the anonymized reference data to the reference server via the secure connection.

10. A method for elevated risk monitoring, the method comprising:
monitoring, by a trusted execution environment of a computing device, sensor data from a plurality of sensors of the computing device, wherein the sensor data is indicative of a physical condition of a user of the computing device;
applying, by the trusted execution environment, a machine-learning classifier to the sensor data to identify an elevated risk of malicious attack to the computing device, wherein the elevated risk is based on the physical condition of the user of the computing device; and
identifying, by the trusted execution environment, the elevated risk of malicious attack in response to applying the machine-learning classifier;
triggering, by the trusted execution environment, a security response in response to identifying the elevated risk;
establishing, by the trusted execution environment, a secure connection with a reference server; and
receiving, by the trusted execution environment, training data for the machine learning classifier via the secure connection; wherein applying the machine-learning classifier to the sensor data comprises supplying the training data to the machine-learning classifier.

11. The method of claim 10, wherein monitoring the sensor data comprises:
monitoring soft behavioral biometric data indicative of usage of the computing device by a user.

12. The method of claim 10, wherein triggering the security response comprises powering on, by the computing device, one or more additional sensor of the computing device in response to identifying the elevated risk.

13. The method of claim 10, wherein triggering the security response comprises selecting a security response based on the elevated risk.

14. The method of claim 10, wherein triggering the security response comprises increasing, by the computing device, an authentication requirement of the computing device in response to identifying the elevated risk.

15. One or more non-transitory, computer-readable storage media comprising a plurality of instructions that in response to being executed cause a computing device to:
monitor, by a trusted execution environment of the computing device, sensor data from a plurality of sensors of the computing device, wherein the sensor data is indicative of a physical condition of a user of the computing device;
apply, by the trusted execution environment, a machine-learning classifier to the sensor data to identify an elevated risk of malicious attack to the computing device, wherein the elevated risk is based on the physical condition of the user of the computing device; and
identify, by the trusted execution environment, the elevated risk of malicious attack in response to applying the machine-learning classifier;
trigger, by the trusted execution environment, a security response in response to identifying the elevated risk;
establish, by the trusted execution environment, a secure connection with a reference server; and
receive, by the trusted execution environment, training data for the machine learning classifier via the secure connection; wherein to apply the machine-learning classifier to the sensor data comprises to supply the training data to the machine-learning classifier.

16. The one or more non-transitory, computer-readable storage media of claim 15, wherein to monitor the sensor data comprises to:
monitor soft behavioral biometric data indicative of usage of the computing device by a user.

17. The one or more non-transitory, computer-readable storage media of claim 15, wherein to trigger the security response comprises to power on one or more additional sensor of the computing device in response to identifying the elevated risk.

18. The one or more non-transitory, computer-readable storage media of claim 15, wherein to trigger the security response comprises to select a security response based on the elevated risk.

19. The one or more non-transitory, computer-readable storage media of claim 15, wherein to trigger the security response comprises to increase an authentication requirement of the computing device in response to identifying the elevated risk.

* * * * *